(12) United States Patent
Nakagawa et al.

(10) Patent No.: US 11,261,801 B2
(45) Date of Patent: Mar. 1, 2022

(54) CONTROL DEVICE, GAS COMPRESSING SYSTEM, CONTROL METHOD, AND PROGRAM

(71) Applicant: MITSUBISHI HEAVY INDUSTRIES COMPRESSOR CORPORATION, Tokyo (JP)

(72) Inventors: Yosuke Nakagawa, Tokyo (JP); Naoto Yonemura, Hiroshima (JP); Kazuhiro Jahami, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 357 days.

(21) Appl. No.: 16/485,842

(22) PCT Filed: Feb. 15, 2018

(86) PCT No.: PCT/JP2018/005262
§ 371 (c)(1),
(2) Date: Aug. 14, 2019

(87) PCT Pub. No.: WO2018/151213
PCT Pub. Date: Aug. 23, 2018

(65) Prior Publication Data
US 2020/0056550 A1    Feb. 20, 2020

(30) Foreign Application Priority Data
Feb. 16, 2017    (JP) .............................. JP2017-027325

(51) Int. Cl.
*F02C 9/28* (2006.01)
*F02C 7/232* (2006.01)
*F04D 27/00* (2006.01)

(52) U.S. Cl.
CPC ................ *F02C 9/28* (2013.01); *F02C 7/232* (2013.01); *F04D 27/00* (2013.01); *F05D 2220/32* (2013.01)

(58) Field of Classification Search
CPC ...... F02C 6/06; F02C 9/16; F02C 9/28; F04D 27/00; F04D 27/0223; F04D 27/0246
See application file for complete search history.

(56) References Cited

U.S. PATENT DOCUMENTS 6,907,722 B2 *  6/2005  Tanaka ...................... F02C 9/20
                                                          415/27
7,472,541 B2 *  1/2009  Takeda .................... F04D 27/02
                                                          415/17

(Continued)

FOREIGN PATENT DOCUMENTS

JP    2006-170194 A    6/2006
JP    2007-239696 A    9/2007
JP    2008-025501 A    2/2008

OTHER PUBLICATIONS

International Search Report issued in corresponding International Patent Application No. PCT/JP2018/005262, dated May 15, 2018 (2 pages).

(Continued)

*Primary Examiner* — Eldon T Brockman
*Assistant Examiner* — Danielle M. Christensen
(74) *Attorney, Agent, or Firm* — Osha Bergman Watanabe & Burton LLP

(57) ABSTRACT

A control device configured to control an inflow adjusting unit that quantitatively adjusts an inflow of a gas into a compressor and to control a valve provided in a second flow passage branching from a first flow passage from the compressor to a compressed gas supply destination includes: a command calculating unit that is configured to calculate a command value for at least any one of the inflow adjusting (Continued)

unit and the valve; and a correction value calculating unit that is configured to calculate a correction value with respect to a command value for at least any one of the inflow adjusting unit and the valve.

12 Claims, 8 Drawing Sheets

(56) References Cited

U.S. PATENT DOCUMENTS

| | | | |
|---|---|---|---|
| 7,556,473 B2* | 7/2009 | Takeshita | F02C 7/236 415/151 |
| 10,584,645 B2* | 3/2020 | Nakagawa | F02C 9/28 |
| 2006/0101824 A1 | 5/2006 | Takeda et al. | |

OTHER PUBLICATIONS

Written Opinion issued in corresponding International Patent Application No. PCT/JP2018/005262, dated May 15, 2018 (7 pages).
International Search Report issued in corresponding Japanese Patent Application No. PCT/JP2018/005262, dated May 15, 2018 (2 pages).
Written Opinion issued in corresponding Japanese Patent Application No. PCT/JP2018/005262, dated May 15, 2018 (7 pages).

* cited by examiner

CONTROL DEVICE, GAS COMPRESSING SYSTEM, CONTROL METHOD, AND PROGRAM

TECHNICAL FIELD

The present invention relates to a control device, a gas compressing system, a control method, and a program.

Priority is claimed on Japanese Patent Application No. 2017-27325, filed Feb. 16, 2017, the content of which is incorporated herein by reference.

BACKGROUND ART

There are systems that compress a gas using a compressor and supply the compressed gas to a compressed gas supply destination, such as gas turbine power plants that compress fuel gas using a compressor to accumulate the compressed fuel gas in a header tank for a gas turbine.

In such systems, there may be a plurality of structures that regulate the amount of supply to a compressed gas supply destination. For example, the gas turbine power plant may be configured such that an inlet of a compressor is provided with an inlet guide vane (IGV), and a recycle line that links a side located further downstream than the compressor with a side located further upstream than the IGV is provided with a recycle valve.

Further, a limit value for securing more than a certain level of flow rate of compressed gas may be set to be variable with respect to one of structures that regulate the amount of supply to a compressed gas supply destination. For example, in the system, the limit value of a vane angle may be set to be variable so that the IGV is opened above a certain level.

In a case where the limit value is set to be variable as described above, the accuracy of control decreases when the reference value of a limit value assumed by a control device that controls a structure for regulating the amount of supply to a compressed gas supply destination and the current set value of the limit value are different from each other. For example, in the system, a case in which the reference value of the limit value of the vane angle of the IGV is set to be 60 degrees and the current set value of the limit value is set to be 45 degrees can be considered. In this case, even when the control device performs control so that the IGV is closed up to the reference value, it is closed only up to the current set value in reality, and a compressed gas of a target value or above flows into the header tank, which leads to an increase in pressure.

On the other hand, Patent Literature 1 discloses that, in a case where the IGV reaches a minimum opening degree, a portion of fuel gas discharged from the compressor is returned to a fuel gas supply line through the recycle valve. The control device disclosed in Patent Literature 1 calculates a correction operation value for the recycle valve on the basis of a pressure measurement value within the header tank. This control device adds a correction operation value to a valve operation value for the recycle valve, and controls the recycle valve using the obtained valve operation correction value.

CITATION LIST

Patent Literature

[Patent Literature 1] Japanese Unexamined Patent Application, First Publication No. 2006-170194

SUMMARY OF INVENTION

Technical Problem

In this manner, coping with a difference between the reference value and the current value of a limit value which is set in one of a plurality of structures for regulating the amount of supply to the compressed gas supply destination by correcting the amount of control for other structures can be considered. In this case, when correction is performed with no need to perform feedback control, there is the possibility of being able to reach a target state more quickly.

For example, in the configuration of a fuel gas compression supply line disclosed in Patent Literature 1, when correction for a recycle valve opening degree can be performed with no need for feedback control, there is the possibility of being able to reach a state in which the pressure within the header tank is maintained at a supply pressure set value more quickly.

The present invention provides a control device, a gas compressing system, a control method, and a program that make it possible to perform correction with no need for feedback control in a case where a difference between the reference value and the current value of a limit value which is set in one of a plurality of structures for regulating the amount of supply to the compressed gas supply destination is coped with by correcting the amount of control for other structures.

Solution to Problem

According to a first aspect of the present invention, there is provided a control device configured to control an inflow adjusting unit that quantitatively adjusts an inflow of a gas into a compressor and to control a valve provided in a second flow passage branching from a first flow passage from the compressor to a compressed gas supply destination, the device including: a command calculating unit that is configured to calculate a command value for at least any one of the inflow adjusting unit and the valve on the basis of a load command value indicating an amount of compressed gas required for the compressed gas supply destination; and a correction value calculating unit that is configured to calculate a correction value with respect to a command value for at least any one of the inflow adjusting unit and the valve on the basis of a difference between a reference value of a state quantity limit value of the inflow adjusting unit and a current set value of the state quantity limit value.

According to a second aspect of the present invention, there is provided a control device including a correction value calculating unit that is configured to calculate a correction value with respect to an opening degree command value on the basis of a difference between a reference value and a current set value, the reference value being of a minimum opening degree of the inlet guide vane provided on the inlet side of the compressor, the current set value being of the minimum opening degree of the inlet guide vane, and the opening degree command value being for at least any one of an inlet guide vane and a recycle valve which is provided in a recycle line that connects an outlet side and an inlet side of a compressor.

The correction value calculating unit may calculate a correction value with respect to an opening degree command value for the recycle valve.

The correction value calculating unit may calculate a correction value with respect to an opening degree command value for the inlet guide vane.

In a case where an opening degree of the inlet guide vane is greater than the current set value of the minimum opening degree, and an amount of compressed gas flowing out of the compressor is greater than a target amount of supply to a supply destination of the compressed gas even with the opening degree of the inlet guide vane set to the current set value of the minimum opening degree, the correction value calculating unit may calculate correction values with respect to an opening degree command value for the inlet guide vane and an opening degree command value for the recycle valve.

According to a third aspect of the present invention, there is provided a gas compressing system including: any of the control devices; the compressor; the inlet guide van; the recycle line; and the recycle valve.

According to a fourth aspect of the present invention, there is provided a control method of controlling an inflow adjusting unit that quantitatively adjusts an inflow of a gas into a compressor and controlling a valve provided in a second flow passage branching from a first flow passage from the compressor to a compressed gas supply destination, the method including: a command calculating step of calculating a command value for at least any one of the inflow adjusting unit and the valve on the basis of a load command value indicating an amount of compressed gas required for the compressed gas supply destination; and a correction value calculating step of calculating a correction value with respect to a command value for at least any one of the inflow adjusting unit and the valve on the basis of a difference between a reference value of a state quantity limit value of the inflow adjusting unit and a current set value of the state quantity limit value.

According to a fifth aspect of the present invention, there is provided a program for causing a computer configured to control an inflow adjusting unit that quantitatively adjusts an inflow of a gas into a compressor and to control a valve provided in a second flow passage branching from a first flow passage from the compressor to a compressed gas supply destination to execute: a command calculating step of calculating a command value for at least any one of the inflow adjusting unit and the valve on the basis of a load command value indicating an amount of compressed gas required for the compressed gas supply destination; and a correction value calculating step of calculating a correction value with respect to a command value for at least any one of the inflow adjusting unit and the valve on the basis of a difference between a reference value of a state quantity limit value of the inflow adjusting unit and a current set value of the state quantity limit value.

Advantageous Effects of Invention

According to the control device, the gas compressing system, the control method, and the program which are described above, it is possible to perform correction with no need for feedback control in a case where a difference between the reference value and the current value of a limit value which is set in one of a plurality of structures for regulating the amount of supply to the compressed gas supply destination is coped with by correcting the amount of control for other structures.

EMBODIMENTS FOR CARRYING OUT THE INVENTION

Hereinafter, embodiments of the present invention will be described, but the following embodiments do not limit the invention related to the scope of claims. In addition, not all combinations of features described in the embodiments are necessarily essential for the solution to problems.

First Embodiment

Figure 1:
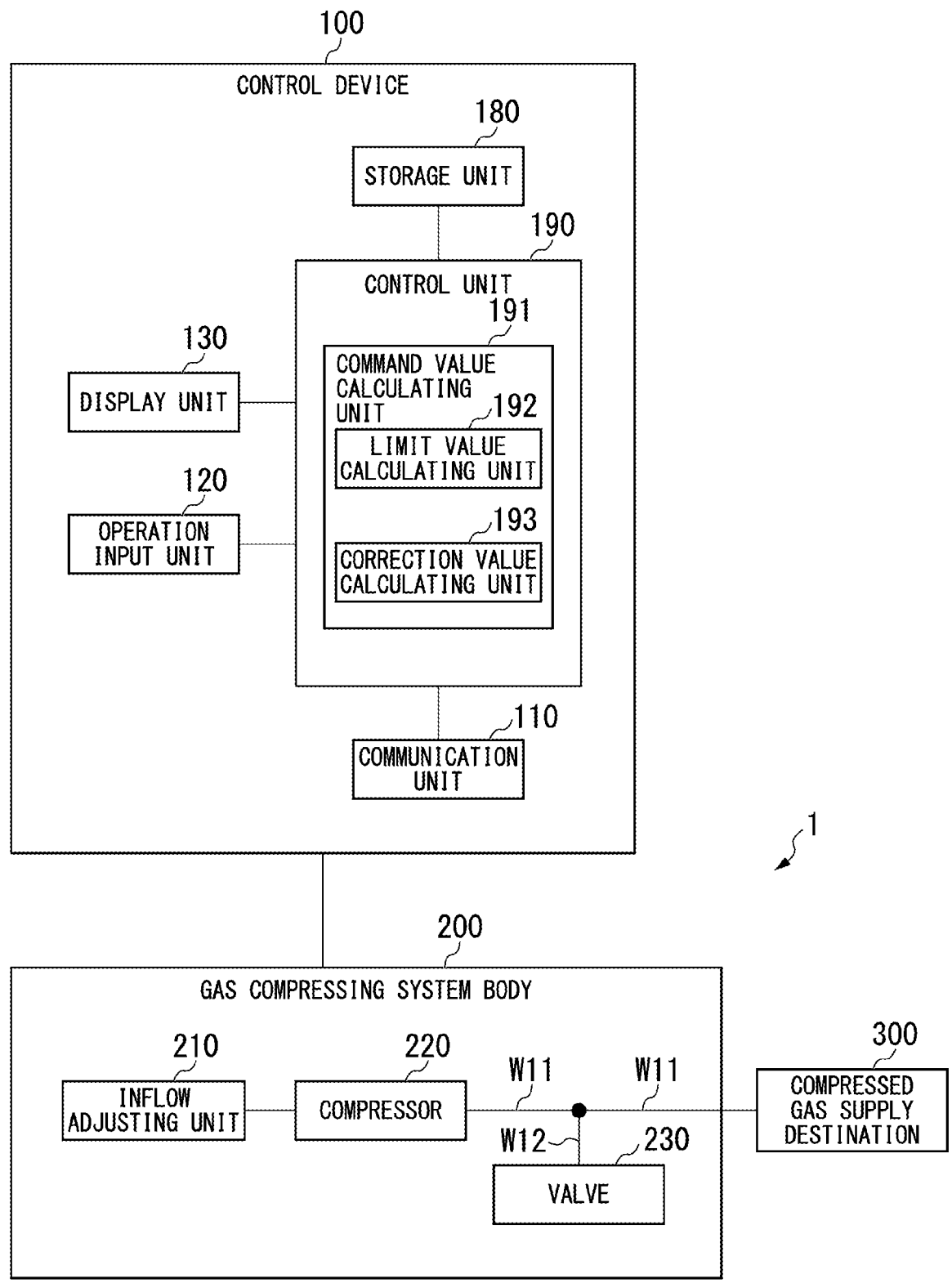
FIG. 1 is a schematic block diagram showing a functional configuration of a gas compressing system according to a first embodiment.

FIG. 1 is a schematic block diagram showing a functional configuration of a gas compressing system according to a first embodiment. As shown in FIG. 1, a gas compressing system 1 includes a control device 100 and a gas compressing system body 200. The control device 100 includes a communication unit 110, an operation input unit 120, a display unit 130, a storage unit 180, and a control unit 190. The control unit 190 includes a command value calculating unit 191. The command value calculating unit 191 includes a limit value calculating unit 192 and a correction value calculating unit 193. The gas compressing system body 200 includes an inflow adjusting unit 210, a compressor 220, a valve 230, a first flow passage W11, and a second flow passage W12.

In addition, the compressor 220 is connected to a compressed gas supply destination 300 through the first flow passage W11. The second flow passage W12 branches from the first flow passage W11, and the second flow passage W12 is provided with the valve 230.

The gas compressing system 1 compresses a gas and supplies the compressed gas to the compressed gas supply destination 300. The gas which is compressed by the gas compressing system 1 is not limited to a specific gas. For example, the gas which is compressed by the gas compressing system 1 may be a fuel gas, air, or a refrigerant.

The compressed gas supply destination 300 is a facility to which the gas compressing system 1 is to supply the compressed gas. The gas compressing system 1 adjusts the amount of supply of the compressed gas to the compressed gas supply destination 300. For example, the compressed gas supply destination 300 may be a header tank or an air reservoir that accumulates the compressed gas at a constant pressure. In this case, the gas compressing system 1 adjusts the amount of compressed gas supplied to the compressed gas supply destination 300 so that a pressure within the compressed gas supply destination 300 becomes constant.

The gas compressing system body 200 compresses the gas in accordance with control of the control device 100 and supplies the compressed gas to the compressed gas supply destination 300.

The inflow adjusting unit 210 is provided on the inlet side of the compressor 220, and adjusts the opening degree of the inflow adjusting unit 210 itself in accordance with control of the control device 100 to thereby quantitatively adjust an inflow of a gas into the compressor 220. The inlet side of the device referred to here is an upstream side on which gas flows into the device. In addition, the outlet side of the device is a downstream side on which gas flows out of the device. The inflow adjusting unit 210 may be an inlet guide vane, or may be an adjustment valve. As described above, the inlet guide vane is also referred to as an IGV. In a case where the inflow adjusting unit 210 is an inlet guide vane, the opening degree of the inflow adjusting unit 210 is adjusted specifically by a vane angle. On the other hand, the adjustment valve referred to here is a valve capable of adjusting an opening degree.

The compressor 220 compresses the gas. The compressor 220 generates the compressed gas supplied to the compressed gas supply destination 300 through this compression.

The first flow passage W11 is a flow passage of the compressed gas from the compressor 220 to the compressed gas supply destination 300.

The second flow passage W12 is a flow passage branching from the first flow passage W11 as described above. The second flow passage W12 is provided in order to adjust the amount of the compressed gas supplied to the compressed gas supply destination 300. By causing a portion of the compressed gas flowing through the first flow passage W11 to flow to the second flow passage W12, the portion of the compressed gas flowing through the first flow passage W11 can be extracted from the first flow passage W11. Thereby, it is possible to reduce the amount of compressed gas supplied to the compressed gas supply destination 300. The compressed gas having flowed from the first flow passage W11 to the second flow passage W12 may be returned to upstream of the compressor 220, may be emitted into the atmosphere, or may be supplied to a facility other than the compressed gas supply destination 300.

The valve 230 is an adjustment valve that adjusts the amount of compressed gas flowing through the second flow passage W12. The valve 230 adjusts the opening degree of the valve 230 itself in accordance with control of the control device 100, to thereby adjust the amount of compressed gas flowing through the second flow passage W12. As described above, the amount of compressed gas supplied to the compressed gas supply destination 300 can be adjusted by adjusting the amount of compressed gas flowing through the second flow passage W12.

The control device 100 controls the gas compressing system body 200 to thereby supply the compressed gas to the compressed gas supply destination 300. Particularly, the control device 100 controls the opening degree of the inflow adjusting unit 210 and the opening degree of the valve 230, to thereby adjust the amount of compressed gas supplied to the compressed gas supply destination 300. The control performed by the control device 100 is not limited to specific control. For example, in a case where the compressed gas supply destination 300 is a header tank or an air reservoir, pressure control for maintaining a constant pressure within the compressed gas supply destination 300 may be performed. Alternatively, the control device 100 may perform flow rate control for maintaining a constant flow rate of compressed air supplied to the compressed gas supply destination 300.

The control device 100 may be configured using a computer such as, for example, a programmable logic controller (PLC) or a workstation (WS).

The communication unit 110 communicates with another device. Particularly, the communication unit 110 receives information indicating the state of the gas compressing system body 200 such as the measurement value of a sensor included in the gas compressing system body 200. In addition, the communication unit 110 transmits a control signal for each unit of the gas compressing system body 200 such as a control signal for the opening degree of the inflow adjusting unit 210 and a control signal for the opening degree of the valve 230.

The operation input unit 120 includes switches disposed on, for example, a control panel, or an input device such as a keyboard, a mouse, or a combination thereof, and receives a user's operation.

The display unit 130 includes meters, gauges, and lamps disposed on a control panel, or a display device such as a display panel such as a liquid crystal panel, or a combination thereof, and displays various types of information.

The storage unit 180 is configured using a storage device included in the control device 100, and displays various types of information.

The control unit 190 controls each unit of the control device 100 to thereby execute various types of processing. The control unit 190 is configured by, for example, a central processing unit (CPU) included in the control device 100 reading out and executing a program from the storage unit 180.

The command value calculating unit 191 calculates command values for the opening degree of the inflow adjusting unit 210 and the opening degree of the valve 230.

The limit value calculating unit 192 determines a limit value of the state quantity of the inflow adjusting unit 210.

Here, the opening degree of the inflow adjusting unit 210 is provided with a lower limit. Examples of the factors in the opening degree of the inflow adjusting unit 210 being provided with a lower limit include a decrease in the accuracy of flow rate control in a case where the opening degree of the inflow adjusting unit 210 is set to be below a certain level, a need to secure more than a certain level of flow rate flowing into the compressor 220 for the purpose of anti-surge, and the like, but are not limited to these.

The limit value of the state quantity of the inflow adjusting unit 210 which is determined by the limit value calculating unit 192 is a value indicating the lower limit of the opening degree of the inflow adjusting unit 210. However, the state quantity of the inflow adjusting unit 210 herein may be a value indicating the opening degree of the inflow adjusting unit 210, and is not limited to the opening degree itself of the inflow adjusting unit 210. For example, in a case where the inflow adjusting unit 210 is an inlet guide vane, and the opening degree of the inflow adjusting unit 210 becomes smaller as a vane angle becomes larger, the limit value of the state quantity may be the upper limit of the vane angle.

In addition, the reference value of the limit value of the state quantity of the inflow adjusting unit 210 is set during the design of the gas compressing system 1. On the other hand, the limit value calculating unit 192 may determine the limit value of the state quantity of the inflow adjusting unit 210 to be a value different from the reference value.

The correction value calculating unit 193 calculates a correction value with respect to the command value for at least any one of the inflow adjusting unit 210 and the valve 230 on the basis of a difference between the reference value of the state quantity limit value of the inflow adjusting unit 210 and the current set value of the state quantity limit value.

Here, the command value calculating unit 191 calculates the command value on the basis of the reference value of the limit value of the state quantity of the inflow adjusting unit 210. Thereby, even in a case where there is a change in the limit value of the state quantity of the inflow adjusting unit 210, it is not necessary to change a calculation expression for the command value calculating unit 191 to calculate the command value, and it is possible to avoid complicating processing of the command value calculating unit 191 in this point. On the other hand, in a case where the limit value of the state quantity of the inflow adjusting unit 210 is different from the reference value, the opening degree of the inflow adjusting unit 210 which is assumed by the command value calculating unit 191 and the actual opening degree of the inflow adjusting unit 210 are different from each other. Such a difference between the opening degrees becomes a cause of a difference between the amount of supply of compressed air to the compressed gas supply destination 300 which is assumed by the command value calculating unit 191 and the actual amount of supply. The correction value calculating unit 193 calculates a correction value for preventing or reducing occurrence of this difference.

The command value calculating unit 191 corrects the command values for the opening degree of the inflow adjusting unit 210 and the opening degree of the valve 230 on the basis of the correction value calculated by the correction value calculating unit 193.

As described above, the correction value calculating unit 193 calculates a correction value with respect to the command value for at least any one of the inflow adjusting unit 210 and the valve 230 on the basis of the difference between the reference value of the state quantity limit value of the inflow adjusting unit 210 and the current set value of this state quantity limit value.

The correction value calculating unit 193 calculates the correction value on the basis of the difference between the reference value of the state quantity limit value of the inflow adjusting unit 210 and the current set value of the state quantity limit value, so that the control device 100 can perform correction through feedforward control. Particularly, the control device 100 need not perform feedback control with respect to correction based on the correction value calculated by the correction value calculating unit 193. Because of this, the control device 100 can bring the amount of compressed gas supplied to the compressed gas supply destination 300 close to a target amount more quickly.

Second Embodiment

In a second embodiment, the gas compressing system 1 described in the first embodiment will be further described by taking an example of a case in which the inflow adjusting unit 210 is an inlet guide vane and the valve 230 is a recycle valve. However, the inflow adjusting unit 210 in the first embodiment is not limited to an inlet guide vane. In addition, the valve 230 in the first embodiment is not limited to a recycle valve.

Figure 2:
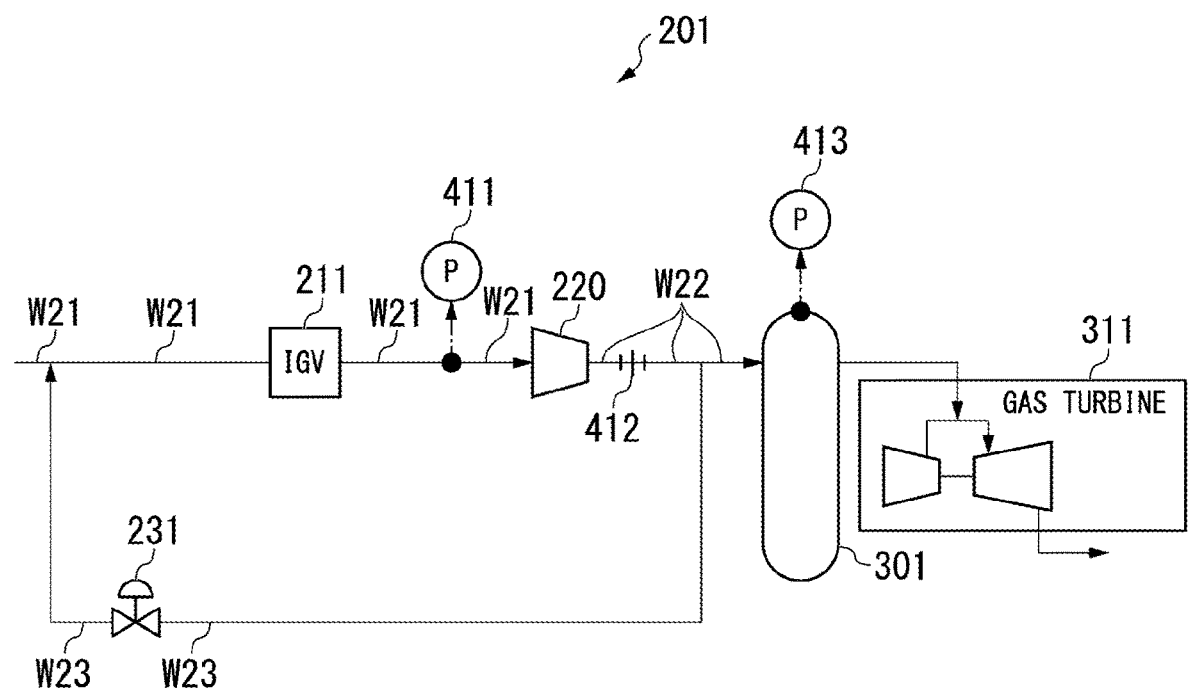
FIG. 2 is a schematic configuration diagram of a fuel gas compression system according to a second embodiment.

FIG. 2 is a schematic configuration diagram of a fuel gas compression system according to the second embodiment of the present invention. As shown in FIG. 2, a fuel gas compression system 201 includes an inlet guide vane 211, a compressor 220, a recycle valve 231, an inlet gas pressure gauge 411, an outlet gas flowmeter 412, a compressor inlet-side line W21, a compressor outlet-side line W22, and a recycle line W23.

The compressor outlet-side line W22 connects the outlet side of the compressor 220 and the inlet side of a header tank 301, and a gas turbine 311 is provided downstream of the header tank 301. In addition, the header tank 301 is provided with a header tank pressure gauge 413.

The fuel gas compression system 201 shown in FIG. 2 corresponds to an example of the gas compressing system body 200 in the gas compressing system 1 shown in FIG. 1, and the header tank 301 corresponds to an example of the compressed gas supply destination 300. On the other hand, the configuration of a control device 100 in the second embodiment is the same as that in the first embodiment.

The compressor inlet-side line W21 is a flow passage of a fuel gas that flows into the compressor 220, and is connected to the inlet side of the compressor 220. The compressor inlet-side line W21 is provided with the inlet guide vane 211, and is further provided with the inlet gas pressure gauge 411 between the inlet guide vane 211 of the compressor inlet-side line W21 and the compressor 220.

The inlet guide vane 211 corresponds to an example of the inflow adjusting unit 210 as described above, and an inflow of a gas into the compressor 220 is quantitatively adjusted by adjusting the opening degree of the inlet guide vane 211 itself in accordance with control of the control device 100. As described above, the adjustment of the opening degree of the inlet guide vane 211 is performed by the adjustment of a vane angle.

The inlet gas pressure gauge 411 measures the inlet pressure of the compressor 220. That is, the inlet gas pressure gauge 411 measures the pressure of a fuel gas in the inlet of the compressor 220.

The compressor outlet-side line W22 is a flow passage of the compressed gas from the compressor 220 to the header tank 301. The compressor outlet-side line W22 corresponds to an example of the first flow passage W11 shown in FIG. 1. The recycle line W23 is a flow passage that branches from the compressor outlet-side line W22, returns to the compressor inlet-side line W21, and returns a portion of the compressed gas flowing through the compressor outlet-side line W22 to the compressor inlet-side line W21. The recycle line W23 corresponds to an example of the second flow passage W12 shown in FIG. 1.

The recycle line W23 is provided with the recycle valve 231. The recycle valve 231 adjusts the opening degree of the recycle valve 231 itself in accordance with control of the control device 100, to thereby adjust the amount of compressed gas flowing through the recycle line W23. The recycle line W23 corresponds to an example of the valve 230 shown in FIG. 1.

In addition, the outlet gas flowmeter 412 is provided on a side located further upstream than a branch from the recycle line W23 in the compressor outlet-side line W22. The side located further upstream than a branch from the recycle line W23 in the compressor outlet-side line W22 is a side close to the outlet of the compressor 220. The outlet gas flowmeter 412 measures the outlet flow rate of the compressor 220. That is, the outlet gas flowmeter 412 measures the flow rate of the compressed gas in the outlet of the compressor 220.

The header tank 301 accumulates the fuel gas compressed by the compressor 220, and supplies the accumulated fuel gas to the gas turbine 311. The gas compressing system 1 adjusts the amount of supply of the fuel gas to the header tank 301 so that the internal pressure of the header tank 301 is maintained constant, whereby the header tank 301 can supply the fuel gas to the gas turbine 311 at a constant pressure.

The header tank pressure gauge 413 measures the internal pressure of the header tank 301. That is, the header tank pressure gauge 413 measures the pressure of the fuel gas inside the header tank 301.

The gas turbine 311 mixes the compressed fuel gas which is supplied from the header tank 301 with compressed air, burns the mixed fuel gas, and generates a rotational force using the pressure of combustion gas. The gas turbine 311 is not limited to a specific application. For example, the gas turbine 311 may be a gas turbine for power generation, but is not limited thereto.

Figure 3:
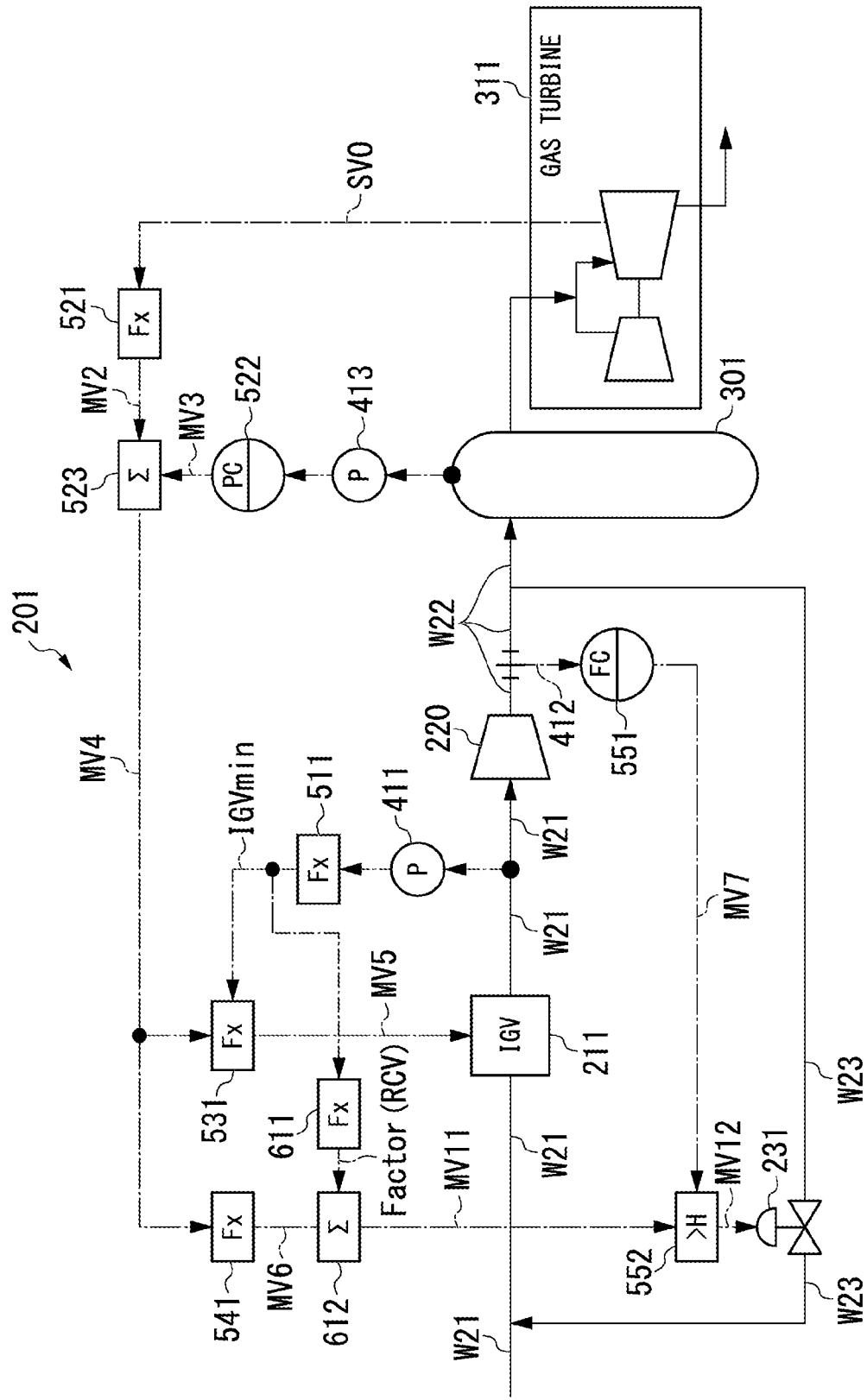
FIG. 3 is a diagram showing a first example of a process in which a control device according to the second embodiment controls the fuel gas compression system.

FIG. 3 is a diagram showing a first example of a process in which the control device 100 controls the fuel gas compression system 201.

In the process shown in FIG. 3, the limit value calculating unit 192 of the command value calculating unit 191 functions as a first function generator 511, and calculates a minimum opening degree IGVmin of the inlet guide vane 211 on the basis of the inlet pressure measurement value of the inlet guide vane 211 measured by the inlet gas pressure gauge 411. For example, in a case where the inlet pressure measurement value is equal to or greater than a reference pressure which is set in advance, the limit value calculating unit 192 sets the minimum opening degree of the inlet guide vane 211 to a first opening degree (for example, 60 degrees at a vane angle). On the other hand, in a case where the inlet pressure measurement value is smaller than the reference pressure, the limit value calculating unit 192 sets the minimum opening degree of the inlet guide vane 211 to a second opening degree (for example, 45 degrees at a vane angle) indicating an opening degree greater than the first opening degree.

In addition, the command value calculating unit 191 functions as a second function generator 521, and calculates a valve operation value MV2 on the basis of a load command value SV0.

The load command value SV0 referred to here indicates the flow rate of the fuel gas required to be supplied to the gas turbine 311. The communication unit 110 may receive the load command value SV0 from another device such as a gas turbine control monitoring device or a central control monitoring device. Alternatively, the command value calculating unit 191 may calculate the load command value SV0 on the basis of the state of the gas turbine 311.

In addition, the valve operation value MV2 is a calculation value which is calculated in a process in which the command value calculating unit 191 calculates an opening degree command value for the inlet guide vane 211 and an opening degree command value for the recycle valve 231. This valve operation value MV2 is an index value indicating a pre-correction opening degree command value for the inlet guide vane 211 and the recycle valve 231.

In addition, the command value calculating unit 191 functions as a pressure regulator 522, and calculates a correction operation value MV3 on the basis of a deviation between a pressure within the header tank 301 measured by the header tank pressure gauge 413 and a pressure set value which is set with respect to this pressure within the header tank 301. The correction operation value MV3 is a calculation value which is calculated in order to correct the valve operation value MV2.

The command value calculating unit 191 functions as a first adder 523, and adds the correction operation value MV3 to the valve operation value MV2, to thereby correct the valve operation value MV2. The command value calculating unit 191 calculates a post-correction valve operation value MV4 on the basis of this correction.

In addition, the command value calculating unit 191 functions as a third function generator 531, and calculates an inlet guide vane opening degree command value MV5 on the basis of the post-correction valve operation value MV4. When this inlet guide vane opening degree command value MV5 is calculated, the command value calculating unit 191 acquires the inlet guide vane opening degree command value MV5 equal to or greater than the minimum opening degree IGVmin on the basis of this minimum opening degree IGVmin of the inlet guide vane 211. The command value calculating unit 191 generates a control signal for setting the opening degree of the inlet guide vane 211 to an opening degree indicated by the inlet guide vane opening degree command value MV5. The command value calculating unit 191 transmits the generated control signal to the inlet guide vane 211 through the communication unit 110.

In addition, the command value calculating unit 191 functions as a fourth function generator 541, and calculates a recycle valve opening degree command value MV6 on the basis of the post-correction valve operation value MV4.

In addition, the command value calculating unit 191 functions as a fifth function generator 611, and calculates a correction value factor (RCV) for the recycle valve opening degree command value MV6 on the basis of the minimum opening degree IGVmin of the inlet guide vane 211.

The command value calculating unit 191 functions as a second adder 612, and adds the correction value factor (RCV) to the recycle valve opening degree command value MV6, to thereby correct the recycle valve opening degree command value MV6. The command value calculating unit 191 calculates a post-correction recycle valve opening degree command value MV11 on the basis of this correction.

In addition, the command value calculating unit 191 functions as a flow rate regulator 551, and calculates a discharge flow rate operation value MV7 on the basis of a deviation between the outlet flow rate of the compressor 220 which is measured by the outlet gas flowmeter 412 and an outlet flow rate set value which is set with respect to this outlet flow rate.

Further, the command value calculating unit 191 functions as a higher-order selector 552, and compares the discharge flow rate operation value MV7 with the post-correction recycle valve opening degree command value MV11 to select the greater value of either as a post-selection opening degree command value MV12. The command value calculating unit 191 generates a control signal for setting the opening degree of the recycle valve 231 to an opening degree indicated by the post-selection opening degree command value MV12, and transmits the generated control signal to the recycle valve 231 through the communication unit 110.

Figure 4:
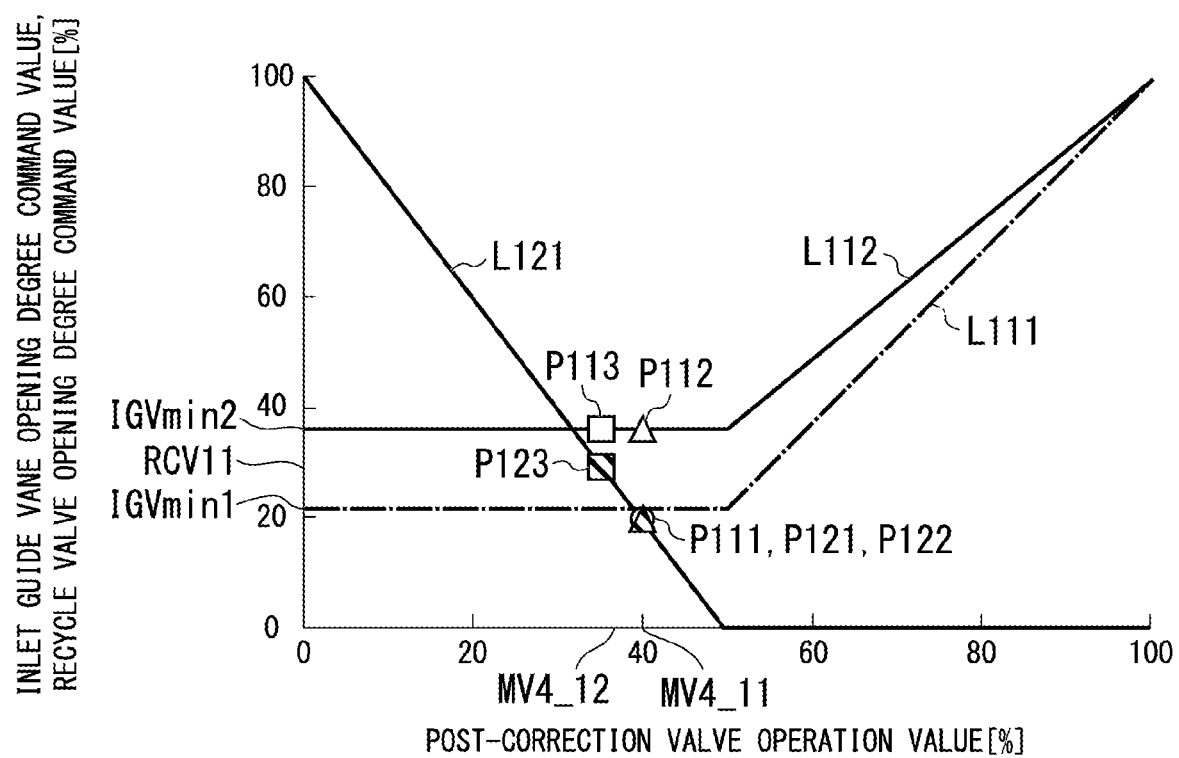
FIG. 4 is a graph showing a first example of an opening degree command value which is calculated by a command value calculating unit according to the second embodiment.

FIG. 4 is a graph showing a first example of an opening degree command value which is calculated by the command value calculating unit 191. The horizontal axis of a graph shown in FIG. 4 represents a post-correction valve operation value. The vertical axis represents an inlet guide vane opening degree command value and a recycle valve opening degree command value.

A line L111 shows a correspondence relation between the post-correction valve operation value MV4 and the inlet guide vane opening degree command value MV5 in a case where the minimum opening degree of the inlet guide vane 211 is set to a first opening degree IGVmin1 which is a reference value. In a case where the minimum opening degree of the inlet guide vane 211 is set to the first opening degree IGVmin1, the command value calculating unit 191 uses a function shown by the line L111 as a function of the third function generator 531 to convert the post-correction valve operation value MV4 into inlet guide vane opening degree command value MV5.

On the other hand, a line L112 shows a correspondence relation between the post-correction valve operation value MV4 and the inlet guide vane opening degree command value MV5 in a case where the minimum opening degree of the inlet guide vane 211 is set to a second opening degree IGVmin2 indicating an opening degree greater than the first opening degree IGVmin1. In a case where the minimum opening degree of the inlet guide vane 211 is set to the second opening degree IGVmin2, the command value calculating unit 191 uses a function shown by the line L112 as a function of the third function generator 531 to convert the post-correction valve operation value MV4 into the inlet guide vane opening degree command value MV5.

As shown by the lines L111 and L112, in the example of FIG. 4, in both of a case where the minimum opening degree of the inlet guide vane 211 is the first opening degree IGVmin1 and a case where the minimum opening degree is the second opening degree IGVmin2, the inlet guide vane opening degree command value MV5 is calculated as a minimum opening degree when the post-correction valve operation value MV4 is equal to or less than 50%. On the other hand, when the post-correction valve operation value MV4 is greater than 50%, the inlet guide vane opening degree command value MV5 increases linearly. When the post-correction valve operation value MV4 is 100%, the inlet guide vane opening degree command value MV5 is calculated as 100%.

In addition, a line L121 shows a correspondence relation between the post-correction valve operation value MV4 and the recycle valve opening degree command value MV6. The command value calculating unit 191 uses a function shown by the line L121 as a function of the fourth function generator 541 to convert the post-correction valve operation value MV4 into the recycle valve opening degree command value MV6.

As shown by the line L121, in the example of FIG. 4, the recycle valve 231 opens in a case where the post-correction valve operation value MV4 is equal to or less than 50% which corresponds to a case where the inlet guide vane opening degree command value MV5 is calculated as a minimum opening degree. In a case where the post-correction valve operation value MV4 is equal to or less than 50%, the recycle valve opening degree command value MV6 increases linearly with a decrease in the post-correction valve operation value MV4. When the post-correction valve operation value MV4 is 0%, the recycle valve opening degree command value MV6 is calculated as 100%. On the other hand, in a case where the post-correction valve operation value MV4 is greater than 50%, the recycle valve opening degree command value MV6 is calculated as 0%.

Points P111 and P112 indicate an example of operating points which are assumed when the command value calculating unit 191 calculates the post-correction valve operation value MV4.

Specifically, the point P111 indicates an example of the post-correction valve operation value MV4 and the inlet guide vane opening degree command value MV5 which are assumed by the command value calculating unit 191. In the example of FIG. 4, the command value calculating unit 191 calculates the post-correction valve operation value MV4 as MV4_11 (for example, 40%). In addition, the command value calculating unit 191 calculates the post-correction valve operation value MV4 in a case where the minimum opening degree of the inlet guide vane 211 is the first opening degree IGVmin1. The point P111 indicates MV4_11 which is the post-correction valve operation value MV4 calculated by the command value calculating unit 191 and IGVmin1 which is the inlet guide vane opening degree command value MV5 which is associated with MV4_11 of the post-correction valve operation value MV4 by the line L111.

In addition, the point P121 indicates an example of the post-correction valve operation value MV4 and the recycle valve opening degree command value MV6 which are assumed by the command value calculating unit 191. The point P121 indicates MV4_11 which is the post-correction valve operation value MV4 calculated by the command value calculating unit 191 and the recycle valve opening degree command value MV6 which is associated with this post-correction valve operation value MV4 by the line L121.

The point P112 indicates an example of the post-correction valve operation value MV4 and the inlet guide vane opening degree command value MV5 in a case where the minimum opening degree of the inlet guide vane 211 is set to the second opening degree IGVmin2.

As described above, the command value calculating unit 191 calculates the post-correction valve operation value MV4 on the basis of the first opening degree IGVmin1. On the other hand, in a case where the minimum opening degree of the inlet guide vane 211 is set to the second opening degree IGVmin2 greater than the first opening degree IGVmin1, a difference occurs between the inlet guide vane opening degree command value MV5 which is assumed by the command value calculating unit 191 and the inlet guide vane opening degree command value MV5 which is set in reality. In the example of FIG. 4, the command value calculating unit 191 calculates the post-correction valve operation value MV4 as MV4_11 using the first opening degree IGVmin1 shown in the point P111 as an operating point of the opening degree of the inlet guide vane 211. On the other hand, the command value calculating unit 191 functions as the third function generator 531, and calculates the inlet guide vane opening degree command value MV5 as the second opening degree IGVmin2 shown in the point P112 on the basis of this post-correction valve operation value MV4.

Due to this difference, the amount of discharge of a fuel gas compressed by the compressor 220 becomes greater than the amount of discharge assumed when the command value calculating unit 191 calculates the post-correction valve operation value MV4, and the amount of supply of a fuel gas to the header tank 301 becomes greater than a required amount. In order to evade or reduce supply of such an excess amount, the correction value calculating unit 193 calculates the correction value factor (RCV) for increasing the opening degree of the recycle valve 231. The correction value calculating unit 193 calculates the correction value factor (RCV) on the basis of, for example, Expression (1).

[Math. 1]

$$\text{Factor}(RCV) = \text{Gain} \cdot \{IGVmin - IGVmin(d)\} \tag{1}$$

Here, Gain is a coefficient which is set to a constant value. IGVmin is a current set value of the minimum opening degree of the inlet guide vane 211. In the example of FIG. 4, the second opening degree IGVmin2 corresponds to an example of IGVmin. IGVmin(d) is a reference value of the minimum opening degree of the inlet guide vane 211. In the example of FIG. 4, the first opening degree IGVmin1 corresponds to an example of IGVmin(d).

The command value calculating unit 191 functions as the second adder 612, and performs correction for the recycle valve opening degree command value MV6 by performing addition represented by Expression (2).

[Math. 2]

$$MV11 = MV6 + \text{Factor(RCV)} \qquad (2)$$

As described with reference to FIG. 3, MV11 indicates a post-correction recycle valve opening degree command value.

A point P123 indicates an example of the post-correction recycle valve opening degree command value MV11.

In the example of FIG. 4, the command value calculating unit 191 calculates the post-correction recycle valve opening degree command value MV11 as RCV11, and the point P123 is a point at which the post-correction recycle valve opening degree command value MV11 is set to RCV11 on the line L121. This point P123 is set to MV4_12 with respect to the post-correction valve operation value.

A point P113 indicates an example of the operating point of the inlet guide vane 211 corresponding to the operating point of the post-correction recycle valve 231. Specifically, the point P113 is a point on the line L112 at which the post-correction valve operation value is set to MV4_12 similarly to the point P123. The inlet guide vane opening degree command value MV5 indicated by the point P113 is set to the second opening degree IGVmin2 similarly to the point P112. In this manner, correction based on a correction value calculated by the correction value calculating unit 193 can be regarded as correction for reducing the post-correction valve operation value MV4.

Meanwhile, in a case where the post-correction valve operation value MV4 is greater than 50%, the correction value calculating unit 193 may calculate a correction value on the basis of a difference between the inlet guide vane opening degree command value MV5 calculated from the line L111 and the inlet guide vane opening degree command value MV5 calculated from the line L112 in accordance with the post-correction valve operation value MV4. Alternatively, as will be described below, the correction value calculating unit 193 may calculate a correction value for the inlet guide vane opening degree command value MV5 in addition to or in place of a correction value for a recycle valve opening degree command value.

As described above, the correction value calculating unit 193 calculates a correction value with respect to an opening degree command value for at least any one of the inlet guide vane 211 and the recycle valve 231 on the basis of a difference between the reference value of the minimum opening degree of the inlet guide vane 211 and the current set value of the minimum opening degree of the inlet guide vane 211. For example, the correction value calculating unit 193 calculates a correction value with respect to an opening degree command value for the recycle valve 231.

The correction value calculating unit 193 calculates a correction value on the basis of the difference between the reference value of the minimum opening degree of the inlet guide vane 211 and the current set value of the minimum opening degree of the inlet guide vane 211, so that the control device 100 can perform correction through feedforward control. Particularly, the control device 100 need not perform feedback control with respect to correction based on the correction value calculated by the correction value calculating unit 193. In this point, the control device 100 can bring the amount of compressed gas supplied to the header tank 301 more quickly close to a target amount.

Figure 5:
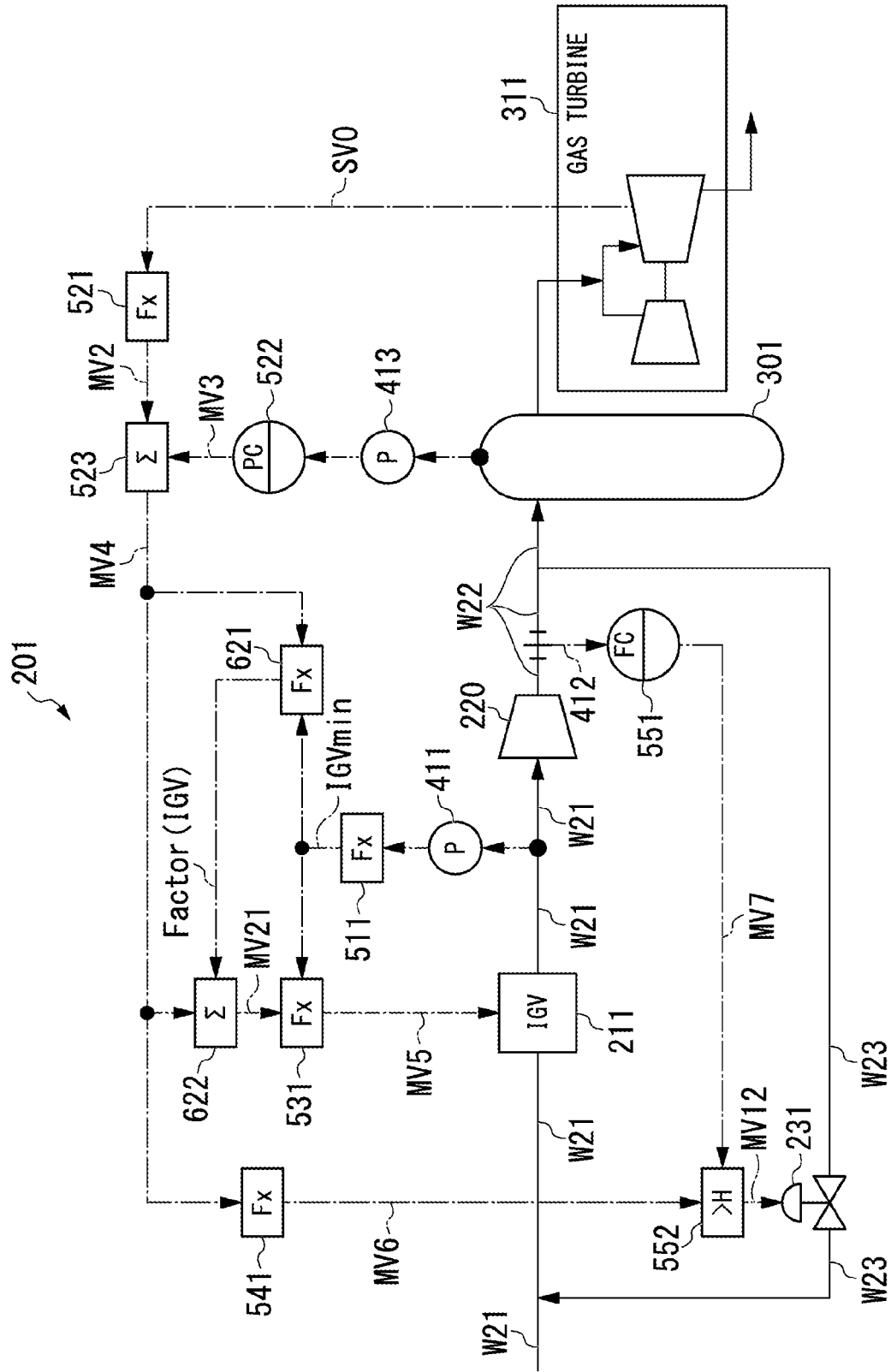
FIG. 5 is a diagram showing a second example of the process in which the control device according to the second embodiment controls the fuel gas compression system.

FIG. 5 is a diagram showing a second example of the process in which the control device 100 controls the fuel gas compression system 201.

In the process shown in FIG. 5, the first function generator 511, the second function generator 521, the pressure regulator 522, the first adder 523, the fourth function generator 541, and the flow rate regulator 551 are the same as those in the example of FIG. 3. The minimum opening degree IGVmin of the inlet guide vane 211, the load command value SV0, the valve operation value MV2, the correction operation value MV3, the post-correction valve operation value MV4, the recycle valve opening degree command value MV6, and the discharge flow rate operation value MV7 are also the same as those in the example of FIG. 3.

On the other hand, the example of FIG. 5 is different from that of FIG. 3, in that the correction value calculating unit 193 calculates a correction value for an inlet guide vane opening degree command value in place of a correction value for a recycle valve opening degree command value.

Specifically, the correction value calculating unit 193 functions as a sixth function generator 621, and calculates a correction value factor (IGV) for the post-correction valve operation value MV4 on the basis of the minimum opening degree IGVmin of the inlet guide vane 211 and the post-correction valve operation value MV4. Here, the post-correction valve operation value MV4 is used as an index value indicating an opening degree command value for the inlet guide vane 211, and the correction value factor (IGV) corresponds to an example of the correction value for an inlet guide vane opening degree command value.

The command value calculating unit 191 functions as a third adder 622, and adds the correction value factor (IGV) to the post-correction valve operation value MV4, to thereby correct the post-correction valve operation value MV4. The command value calculating unit 191 calculates a post-correction inlet guide vane opening degree command value MV21 on the basis of this correction.

Further, the command value calculating unit 191 functions as the third function generator 531, and calculates the inlet guide vane opening degree command value MV5 on the basis of the post-correction inlet guide vane opening degree command value MV21. The third function generator 531 is the same as that in the example of FIG. 3, except that the command value calculating unit 191 is based on the post-correction inlet guide vane opening degree command value MV21 in place of the post-correction valve operation value MV4. In addition, similarly to the example of FIG. 3, the command value calculating unit 191 generates a control signal for setting the opening degree of the inlet guide vane 211 to an opening degree indicated by the inlet guide vane opening degree command value MV5, and transmits the generated control signal to the inlet guide vane 211 through the communication unit 110.

In addition, the command value calculating unit 191 functions as the higher-order selector 552, and compares the discharge flow rate operation value MV7 with the recycle valve opening degree command value MV6 to select the greater value of either as the post-selection opening degree command value MV12. The higher-order selector 552 is the same as that in the example of FIG. 3, except that the command value calculating unit 191 compares the recycle valve opening degree command value MV6 with the discharge flow rate operation value MV7 in place of the post-correction recycle valve opening degree command value MV11. In addition, similarly to the example of FIG. 3, the command value calculating unit 191 generates a control signal for setting the opening degree of the recycle valve 231 to an opening degree indicated by the post-selection opening degree command value MV12, and transmits the generated control signal to the recycle valve 231 through the communication unit 110.

Figure 6:
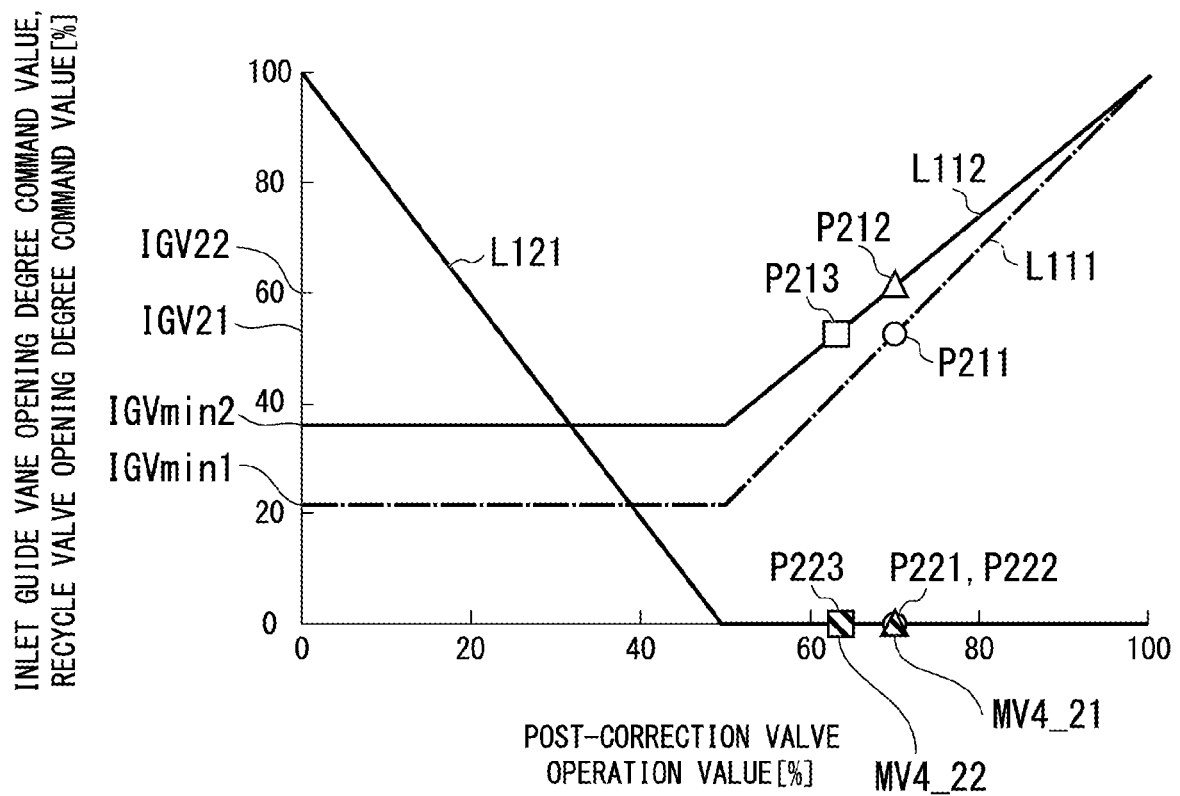
FIG. 6 is a graph showing a second example of the opening degree command value which is calculated by the command value calculating unit according to the second embodiment.

FIG. 6 is a graph showing a second example of the opening degree command value which is calculated by the command value calculating unit 191. Similarly to the example of FIG. 4, the horizontal axis of the graph shown in FIG. 6 represents a post-correction valve operation value. The vertical axis represents an inlet guide vane opening degree command value and a recycle valve opening degree command value.

The lines L111, L112 and L121 are also the same as those in the example of FIG. 4.

On the other hand, in the example of FIG. 6 unlike the example of FIG. 4, the command value calculating unit 191 calculates the post-correction valve operation value MV4 as MV4_21. A point P211 is a point at which the post-correction valve operation value MV4 is set to MV4_21 on the line L111. In addition, a point P221 is a point at which the post-correction valve operation value MV4 is set to MV4_21 on the line L121. In this manner, the points P211 and P221 indicate an example of operating points which are assumed when the command value calculating unit 191 calculates the post-correction valve operation value MV4.

MV4_21 is a value greater than 50%, and the inlet guide vane opening degree command value MV5 is calculated to be greater than the minimum opening degree even on the basis of any of the line L111 and the line L112. On the other hand, as shown by the point P221, the recycle valve opening degree command value is calculated as 0%.

In addition, a point P212 indicates an example of the inlet guide vane opening degree command value MV5 which is calculated by the command value calculating unit 191 on the basis of MV4_21 of the post-correction valve operation value MV4. A point P222 indicates an example of the recycle valve opening degree command value MV6 which is calculated by the command value calculating unit 191 on the basis of MV4_21 of the post-correction valve operation value MV4.

In the example of FIG. 6, the command value calculating unit 191 also calculates the post-correction valve operation value MV4 on the basis of the first opening degree IGVmin1. On the other hand, in a case where the minimum opening degree of the inlet guide vane 211 is set to the second opening degree IGVmin2 greater than the first opening degree IGVmin1, and the correction value calculating unit 193 is assumed not to perform correction, a difference occurs between the inlet guide vane opening degree command value MV5 which is assumed by the command value calculating unit 191 and the inlet guide vane opening degree command value MV5 which is set in reality. Specifically, the command value calculating unit 191 calculates the post-correction valve operation value MV4 as MV4_21 using an opening degree IGV21 indicated by the point P211 as an operating point with respect to the opening degree of the inlet guide vane 211. On the other hand, in a case where the correction value calculating unit 193 does not perform correction, the command value calculating unit 191 functions as the third function generator 531, and calculates the inlet guide vane opening degree command value as an opening degree IGV22 indicated by the point P212 on the basis of MV4_21 of the post-correction valve operation value MV4.

Due to this difference, the amount of discharge of a fuel gas compressed by the compressor 220 becomes greater than the amount of discharge assumed when the command value calculating unit 191 calculates the post-correction valve operation value MV4, and the amount of supply of a fuel gas to the header tank 301 becomes greater than a required amount. In order to evade or reduce such an excess of the amount of supply, the correction value calculating unit 193 calculates a correction value factor (IGV) for reducing the opening degree of the inlet guide vane 211. The correction value calculating unit 193 calculates the correction value factor (IGV) on the basis of, for example, Expression (3).

[Math. 3]

$$\text{Factor}(IGV) = MV4 - \frac{100 - IGV\min(d)[\%]}{100 - IGV\min[\%]}(MV4 - 100) - 100 \qquad (3)$$

As described with reference to FIG. 3, MV4 indicates a post-correction valve operation value. In addition, IGVmin[%] is a percentage notation of the current set value of the minimum opening degree of the inlet guide vane 211. In the example of FIG. 6, the percentage notation of the second opening degree IGVmin2 corresponds to an example of IGVmin[%]. IGVmin(d)[%] is a percentage notation of the reference value of the minimum opening degree of the inlet guide vane 211. In the example of FIG. 6, the percentage notation of the first opening degree IGVmin1 corresponds to an example of IGVmin(d)[%].

The command value calculating unit 191 functions as the third adder 622, and performs correction for the post-correction valve operation value MV4 by performing addition represented by Expression (4).

[Math. 4]

$$MV21 = MV4 + \text{Factor}(IGV) \qquad (4)$$

As described with reference to FIG. 5, MV21 indicates a post-correction inlet guide vane opening degree command value. In addition, as described above, the post-correction valve operation value MV4 referred to here is used as an index value indicating an opening degree command value for the inlet guide vane 211.

In the example of FIG. 6, the command value calculating unit 191 calculates the post-correction inlet guide vane opening degree command value MV21 as IGV21, and a point P213 is a point at which the post-correction inlet guide vane opening degree command value MV21 is set to IGV21 on the line L112. This point P213 is set to MV4_22 with respect to the post-correction valve operation value.

The point P213 indicates an example of the operating point of the recycle valve 231 corresponding to the operating point of the post-correction inlet guide vane 211. Specifically, a point P223 is a point on the line L121 at which the post-correction valve operation value is set to MV4_22 similarly to the point P213. A recycle valve opening degree command value indicated by the point P223 is set to 0% similarly to the case of the point P221 and the case of the point P222. In this manner, correction based on a correction value which is calculated by the correction value calculating unit 193 can be regarded as correction for reducing the post-correction valve operation value MV4.

In addition, in the example of FIG. 6, the inlet guide vane opening degree command value MV5 of the point P213 is set to IGV21 similarly to the case of the point P211. In this manner, the correction value calculating unit 193 calculates a correction value for setting the inlet guide vane opening degree command value to the same value as a value assumed when the command value calculating unit 191 calculates the post-correction valve operation value MV4. Thereby, it is possible to make the inlet guide vane opening degree command value which is set in reality coincident with the inlet guide vane opening degree command value assumed when the command value calculating unit 191 calculates the post-correction valve operation value MV4, and to evade an excess of supply of a fuel gas to the header tank 301.

Meanwhile, in a case where the post-correction valve operation value MV4 is equal to or less than 50%, as described with reference to FIGS. 3 and 4, the correction value calculating unit 193 may calculate a correction value for the recycle valve opening degree command value. In addition, in a case where the amount of supply of a fuel gas to the header tank 301 is not able to be sufficiently reduced by correction for the inlet guide vane opening degree command value alone, as will be described below, the correction value calculating unit 193 may calculate a correction value for the recycle valve opening degree command value in addition to the correction value for the inlet guide vane opening degree command value.

As described above, the correction value calculating unit 193 calculates a correction value with respect to an opening degree command value for at least any one of the inlet guide vane 211 and the recycle valve 231 on the basis of a difference between the reference value of the minimum opening degree of the inlet guide vane 211 and the current set value of the minimum opening degree of the inlet guide vane 211. For example, the correction value calculating unit 193 calculates a correction value with respect to an opening degree command value for the inlet guide vane 211.

The correction value calculating unit 193 calculates a correction value on the basis of the difference between the reference value of the minimum opening degree of the inlet guide vane 211 and the current set value of the minimum opening degree of the inlet guide vane 211, so that the control device 100 can perform correction through feedforward control. Particularly, the control device 100 need not perform feedback control with respect to correction based on the correction value calculated by the correction value calculating unit 193. In this point, the control device 100 can bring the amount of compressed gas supplied to the header tank 301 more quickly close to a target amount.

Figure 7:
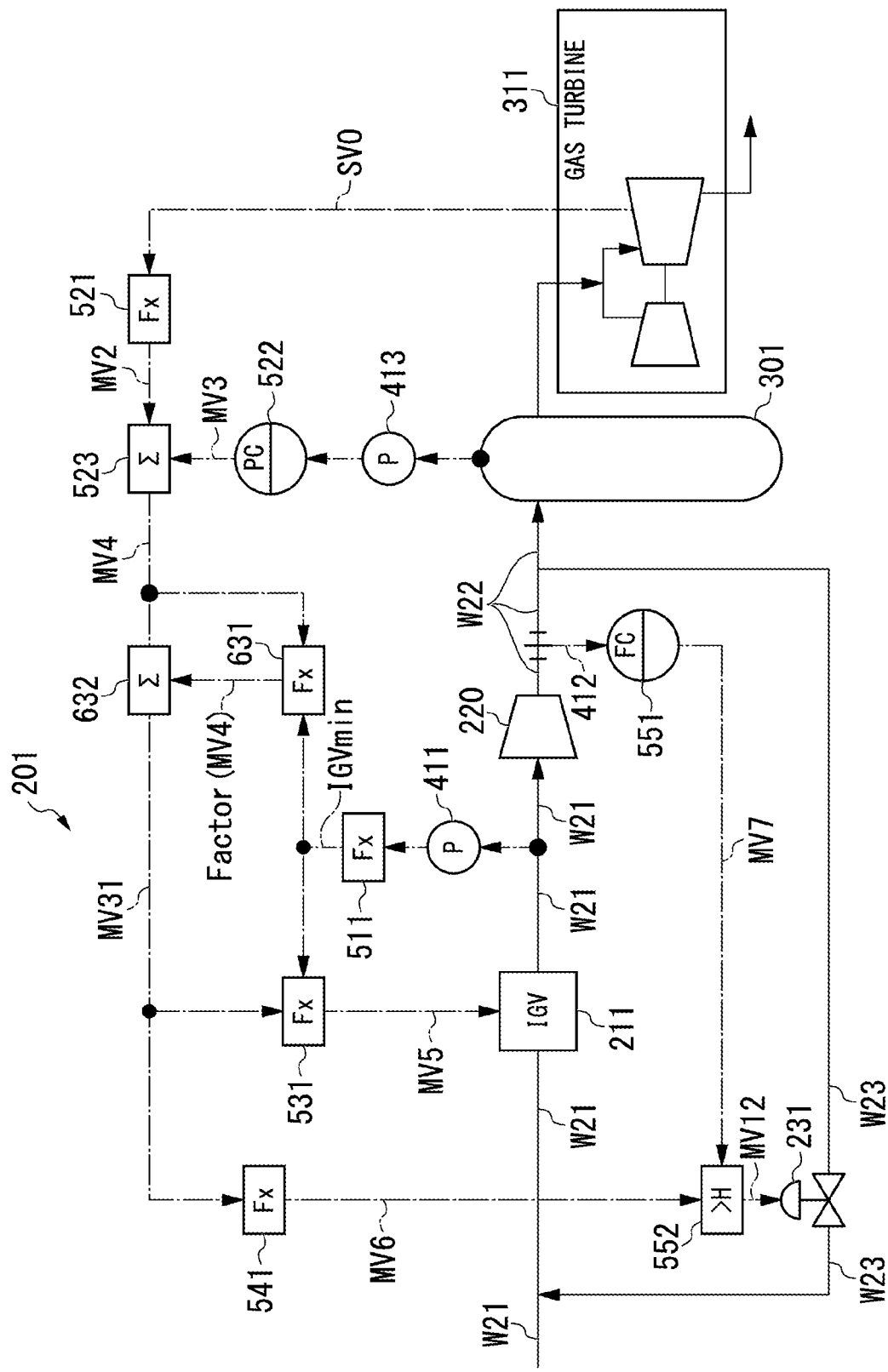
FIG. 7 is a diagram showing a third example of the process in which the control device according to the second embodiment controls the fuel gas compression system.

FIG. 7 is a diagram showing a third example of the process in which the control device 100 controls the fuel gas compression system 201.

In the process shown in FIG. 7, the first function generator 511, the second function generator 521, the pressure regulator 522, the first adder 523, and the flow rate regulator 551 are the same as those in the example of FIG. 3. The minimum opening degree IGVmin of the inlet guide vane 211, the load command value SV0, the valve operation value MV2, the correction operation value MV3, the post-correction valve operation value MV4, and the discharge flow rate operation value MV7 are also the same as those in the example of FIG. 3.

On the other hand, the example of FIG. 7 is different from that of FIG. 3, in that the correction value calculating unit 193 calculates a correction value common to the recycle valve opening degree command value and the inlet guide vane opening degree command value.

Specifically, the correction value calculating unit 193 functions as a seventh function generator 631, and calculates a correction value factor (MV4) for the post-correction valve operation value MV4 on the basis of the minimum opening degree IGVmin of the inlet guide vane 211 and the post-correction valve operation value MV4. Here, the post-correction valve operation value MV4 is used as an index value indicating an opening degree command value for the inlet guide vane 211 and an opening degree command value for the recycle valve 231, and the correction value factor (MV4) corresponds to an example of the correction value for the inlet guide vane opening degree command value and the recycle valve opening degree command value.

The command value calculating unit 191 functions as a fourth adder 632, and adds the correction value factor (MV4) to the post-correction valve operation value MV4, to thereby correct the post-correction valve operation value MV4. The command value calculating unit 191 calculates a post-recorrection valve operation value MV31 on the basis of this correction.

Further, the command value calculating unit 191 functions as the third function generator 531, and calculates the inlet guide vane opening degree command value MV5 on the basis of the post-recorrection valve operation value MV31. The third function generator 531 is the same as that in the example of FIG. 3, except that the command value calculating unit 191 is based on the post-recorrection valve operation value MV31 in place of the post-correction valve operation value MV4. In addition, similarly to the example of FIG. 3, the command value calculating unit 191 generates a control signal for setting the opening degree of the inlet guide vane 211 to an opening degree indicated by the inlet guide vane opening degree command value MV5, and transmits the generated control signal to the inlet guide vane 211 through the communication unit 110.

In addition, the command value calculating unit 191 functions as the fourth function generator 541, and calculates the recycle valve opening degree command value MV6 on the basis of the post-recorrection valve operation value MV31. The fourth function generator 541 is the same as that in the example of FIG. 3, except that the command value calculating unit 191 is based on the post-recorrection valve operation value MV31 in place of the post-correction valve operation value MV4.

In addition, similarly to the example of FIG. 5, the command value calculating unit 191 functions as the higher-order selector 552, and compares the discharge flow rate operation value MV7 with the recycle valve opening degree command value MV6 to select the greater value of either as the post-selection opening degree command value MV12. In addition, similarly to the example of FIG. 3, the command value calculating unit 191 generates a control signal for setting the opening degree of the recycle valve 231 to an opening degree indicated by the post-selection opening degree command value MV12, and transmits the generated control signal to the recycle valve 231 through the communication unit 110.

Figure 8:
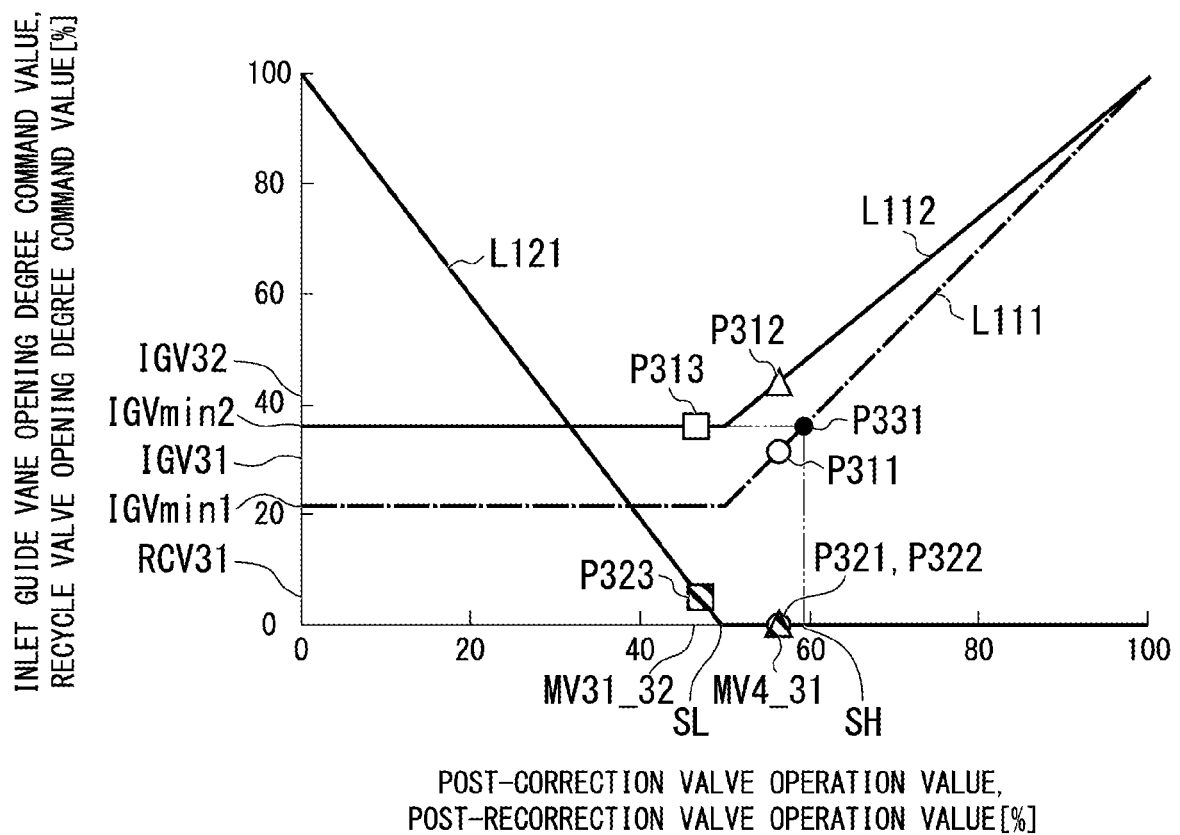
FIG. 8 is a graph showing a third example of the opening degree command value which is calculated by the command value calculating unit according to the second embodiment.

FIG. 8 is a graph showing a third example of the opening degree command value which is calculated by the command value calculating unit 191. In the example of FIG. 8, the horizontal axis of the graph represents a post-correction valve operation value and a post-recorrection valve operation value. The vertical axis represents an inlet guide vane opening degree command value and a recycle valve opening degree command value.

The lines L111, L112 and L121 are the same as those in the example of FIG. 4.

On the other hand, in the example of FIG. 8 unlike the example of FIG. 4, the command value calculating unit 191 calculates the post-correction valve operation value MV4 as MV4_31.

A point P311 is a point at which the post-correction valve operation value MV4 is set to MV4_31 on the line L111. A point P321 is a point at which the post-correction valve operation value MV4 is set to MV4_31 on the line L121. These points P311 and P321 indicate an example of an operating point which is assumed when the command value calculating unit 191 calculates the post-correction valve operation value MV4. The command value calculating unit 191 assumes the opening degree of the inlet guide vane 211 to be IGV31 indicated by the point P311. In addition, the command value calculating unit 191 assumes the opening degree of the recycle valve 231 to be 0% indicated by the point P321.

In addition, a point P312 is a point at which the post-correction valve operation value MV4 is set to MV4_31 on the line L112. The inlet guide vane opening degree command value of the point P312 is set to IGV32. A point P322 is a point at which the post-correction valve operation value MV4 is set to MV4_31 on the line L121, and is the same point as the point P321.

In a case where the minimum opening degree of the inlet guide vane 211 is set to IGVmin2, and the correction value calculating unit 193 is assumed not to perform correction for the post-correction valve operation value MV4, the command value calculating unit 191 functions as the third function generator 531, and calculates the inlet guide vane opening degree command value MV5 as IGV32 indicated by the point P312.

In this case, the command value calculating unit 191 functions as the third function generator 531 with respect to IGV31 of the inlet guide vane opening degree command value assumed when the command value calculating unit 191 calculates the post-recorrection valve operation value MV31, and the calculate inlet guide vane opening degree command value is different from IGV32. Due to this difference, the amount of discharge of a fuel gas compressed by the compressor 220 becomes greater than the amount of discharge assumed when the command value calculating unit 191 calculates the post-correction valve operation value MV4, and the amount of supply of a fuel gas to the header tank 301 becomes greater than a required amount. In order to evade or reduce such an excess of the amount of supply, the correction value calculating unit 193 calculates the correction value factor (MV4).

Here, MV4_31 is a value greater than 50%, and correction for reducing the opening degree of the inlet guide vane 211 can be performed. Specifically, since IGV32 of the inlet guide vane opening degree command value indicated by the point P312 is greater than IGVmin2 which is the minimum opening degree of the inlet guide vane 211, the opening degree of the inlet guide vane 211 can be reduced to IGVmin2. In FIG. 8, 50% of the post-recorrection valve operation value MV31 is shown by SL.

In addition, MV4_31 is a value smaller than SH. SH is a post-correction valve operation value of a point P331 at which the inlet guide vane opening degree command value is set to the second opening degree IGVmin2 on the line L111.

In a case where the post-correction valve operation value MV4 is greater than SL and is smaller than SH, correction for reducing the opening degree of the inlet guide vane 211 can be performed, but even when the opening degree of the inlet guide vane 211 is reduced to the second opening degree IGVmin2, the opening degree is larger than IGV31 assumed by the command value calculating unit 191. Therefore, a decrease in the supply of a fuel gas to the header tank 301 is not sufficient.

Consequently, the correction value calculating unit 193 calculates a correction value for reducing the opening degree of the inlet guide vane 211 and increasing the opening degree of the recycle valve 231. Specifically, the correction value calculating unit 193 calculates a correction value for correcting MV4_31 of the post-correction valve operation value MV4 to MV31_32 of the post-recorrection valve operation value MV31.

Here, a point P313 is a point at which the post-recorrection valve operation value MV31 is set to MV31_32 on the line L112. The inlet guide vane opening degree command value of this point P313 is IGVmin2, and is set to be smaller than IGV32 in the case of the point P312. In addition, a point P323 is a point at which the post-recorrection valve operation value MV31 is set to MV31_32 on the line L121. The recycle valve opening degree command value of this point P323 is RGV31, and is set to have an opening degree greater than 0% (fully closed) in the case of the point P321.

The correction value calculating unit 193 calculates the correction value factor (MV4) for the post-correction valve operation value MV4 on the basis of Expression (5).

[Math. 5]

$$\text{Factor}(MV4) = \text{Factor}(\alpha) + \text{Factor}(\beta) \qquad (5)$$

Here, Factor($\alpha$) is represented as in Expression (6).

[Math. 6]

$$\text{Factor}(\alpha) = \min\{\text{Factor}(IGV), \max\{0.0, MV4-50\}\} \qquad (6)$$

Here, min indicates a function of selecting a minimum value among the values of arguments. In addition, max indicates a function of selecting a maximum value among the values of arguments. In addition, MV4 is represented as a percentage.

In a case where MV4 is equal to or less than 50%, the value of Factor($\alpha$) is set to 0. In a case where MV4 is equal to or less than 50%, this value indicates that correction for the opening degree of the inlet guide vane 211 is not performed since the opening degree of the inlet guide vane 211 is set to the minimum opening degree.

On the other hand, in a case where MV4 is greater than 50%, the value of Factor($\alpha$) is set to the smaller of either Factor(IGV) calculated in Expression (3) or MV4−50%. Factor($\alpha$) in this case indicates a correction value for reducing the post-correction valve operation value MV4 until the opening degree of the inlet guide vane 211 is set to the minimum opening degree.

In addition, Factor($\beta$) is represented as in Expression (7).

[Math. 7]

$$\text{Factor}(\beta) = \text{Factor}(RCV) \cdot \left(1 - \frac{\text{Factor}(\alpha)}{\text{Factor}(IGV)}\right) \qquad (7)$$

Factor($\beta$) indicates a correction value for the post-correction valve operation value MV4 for increasing the opening degree of the recycle valve 231 so as to compensate for a shortfall in correction in a case where the opening degree of the inlet guide vane 211 is set to the minimum opening degree on the basis of Expression (6).

The command value calculating unit 191 functions as the fourth adder 632, and performs correction for the post-correction valve operation value by performing addition represented by Expression (8).

[Math. 8]

$$MV31 = MV4 + \text{Factor}(MV4) \qquad (8)$$

Meanwhile, according to Expressions (4) to (8), in a case where the value of the post-correction valve operation value MV4 is equal to or less than 50%, correction for increasing the opening degree of the recycle valve 231 can be performed similarly to the examples described with reference to FIGS. 3 and 4.

In addition, according to Expressions (4) to (8), in a case where the value of the post-correction valve operation value MV4 is greater than SH, correction for reducing the opening degree of the inlet guide vane 211 can be performed similarly to the examples described with reference to FIGS. 5 and 6.

As described above, in a case where the opening degree of the inlet guide vane 211 is greater than the current set value of the minimum opening degree, and the amount of compressed gas flowing out of the compressor 220 is greater than a supply target amount of the header tank 301 even with the opening degree of the inlet guide vane 211 set to the current set value of the minimum opening degree, the correction value calculating unit 193 calculates correction values with respect to an opening degree command value for the inlet guide vane 211 and an opening degree command value for the recycle valve 231.

Thereby, the control device 100 can perform correction for making the amount of supply of a fuel gas from the compressor 220 to the header tank 301 fit in with a required amount even in the vicinity of a boundary between an operation region and a non-operation region of the recycle valve 231. The operation region of the recycle valve 231 referred to here is a region in which the opening degree of the recycle valve 231 is set to be greater than 0%. The non-operation region of the recycle valve 231 is a region in which the opening degree of the recycle valve 231 is set to be 0%. In the example of FIG. 8, the post-correction valve operation value MV4 is 50%, and is set to a boundary between the operation region and the non-operation region of the recycle valve 231.

In addition, the correction value calculating unit 193 calculates a correction value on the basis of a difference between the reference value of the minimum opening degree of the inlet guide vane 211 and the current set value of the minimum opening degree of the inlet guide vane 211, so that the control device 100 can perform correction through feedforward control. Particularly, the control device 100 need not perform feedback control with respect to correction based on the correction value calculated by the correction value calculating unit 193. In this point, the control device 100 can bring the amount of compressed gas supplied to the header tank 301 more quickly close to a target amount.

Meanwhile, a program for realizing all or some of functions of the control unit 190 is recorded in a computer readable recording medium, and thus a process of each unit may be performed by causing a computer system to read and execute the program recorded in this recording medium. Meanwhile, the term "computer system" referred to here is assumed to include an OS or hardware such as peripheral devices.

In addition, the "computer system" is also assumed to include a homepage providing environment (or a display environment) in a case where a WWW system is used.

In addition, the term "computer readable recording medium" refers to a flexible disk, a magneto-optic disc, a ROM, a portable medium such as a CD-ROM, and a storage device such as a hard disk built into the computer system. In addition the above-mentioned program may be a program which is used for realizing some of the aforementioned functions, and may be a program which is capable of realizing the aforementioned functions by a combination of programs previously recorded in the computer system.

Hereinbefore, the embodiments of the present invention have been described in detail with the accompanying drawings, but specific configurations are not limited to these embodiments, and also include a change in design and the like without departing from the scope of the present invention.

INDUSTRIAL APPLICABILITY

An embodiment of the present invention relates to a control device configured to control an inflow adjusting unit that quantitatively adjusts an inflow of a gas into a compressor and to control a valve provided in a second flow passage branching from a first flow passage from the compressor to a compressed gas supply destination, the device including: a command calculating unit that is configured to calculate a command value for at least any one of the inflow adjusting unit and the valve on the basis of a load command value indicating an amount of compressed gas required for the compressed gas supply destination; and a correction value calculating unit that is configured to calculate a correction value with respect to a command value for at least any one of the inflow adjusting unit and the valve on the basis of a difference between a reference value of a state quantity limit value of the inflow adjusting unit and a current set value of the state quantity limit value.

According to this embodiment, it is possible to perform correction with no need for feedback control in a case where a difference between the reference value and the current value of a limit value which is set in one of a plurality of structures for regulating the amount of supply to the compressed gas supply destination is coped with by correcting the amount of control for other structures.

REFERENCE SIGNS LIST

1 Gas compressing system
100 Control device
110 Communication unit
120 Operation input unit
130 Display unit
180 Storage unit
190 Control unit
191 Command value calculating unit
192 Limit value calculating unit
193 Correction value calculating unit
200 Gas compressing system body
210 Inflow adjusting unit
220 Compressor
230 Valve
300 Compressed gas supply destination
201 Fuel gas compression system
211 Inlet guide vane
231 Recycle valve
301 Header tank
311 Gas turbine
411 Inlet gas pressure gauge
412 Outlet gas flowmeter
413 Header tank pressure gauge
W11 First flow passage
W12 Second flow passage
W21 Compressor inlet-side line
W22 Compressor outlet-side line
W23 Recycle line

The invention claimed is:

1. A control device configured to control an inflow adjusting unit that quantitatively adjusts an inflow of a gas into a compressor and to control a valve provided in a second flow passage branching from a first flow passage from the compressor to a compressed gas supply destination, the device comprising:
    a command calculating unit that is configured to calculate a command value for at least any one of the inflow adjusting unit and the valve on the basis of a load command value indicating an amount of compressed gas required for the compressed gas supply destination; and
    a correction value calculating unit that is configured to calculate a correction value with respect to a command value for at least any one of the inflow adjusting unit and the valve on the basis of a difference between a reference value of a state quantity limit value of the inflow adjusting unit and a current set value of the state quantity limit value.

2. A control device comprising a correction value calculating unit that is configured to calculate a correction value with respect to an opening degree command value on the basis of a difference between a reference value and a current set value, the reference value being of a minimum opening degree of an inlet guide vane provided on an inlet side of a compressor, the current set value being of the minimum opening degree of the inlet guide vane, and the opening degree command value being for at least any one of the inlet guide vane and a recycle valve which is provided in a recycle line that connects an outlet side and the inlet side of the compressor.

3. The control device according to claim 2, wherein the correction value calculating unit is configured to calculate a correction value with respect to an opening degree command value for the recycle valve.

4. The control device according to claim 3, wherein the correction value calculating unit is configured to calculate a correction value with respect to an opening degree command value for the inlet guide vane.

5. The control device according to claim 4, wherein, in a case where an opening degree of the inlet guide vane is greater than the current set value of the minimum opening degree, and an amount of compressed gas flowing out of the compressor is greater than a target amount of supply to a supply destination of the compressed gas even with the opening degree of the inlet guide vane set to the current set value of the minimum opening degree, the correction value calculating unit calculates correction values with respect to an opening degree command value for the inlet guide vane and an opening degree command value for the recycle valve.

6. The control device according to claim 3, wherein, in a case where an opening degree of the inlet guide vane is greater than the current set value of the minimum opening degree, and an amount of compressed gas flowing out of the compressor is greater than a target amount of supply to a supply destination of the compressed gas even with the opening degree of the inlet guide vane set to the current set value of the minimum opening degree, the correction value calculating unit calculates correction values with respect to an opening degree command value for the inlet guide vane and an opening degree command value for the recycle valve.

7. The control device according to claim 2, wherein the correction value calculating unit is configured to calculate a correction value with respect to an opening degree command value for the inlet guide vane.

8. The control device according to claim 7, wherein, in a case where an opening degree of the inlet guide vane is greater than the current set value of the minimum opening degree, and an amount of compressed gas flowing out of the compressor is greater than a target amount of supply to a supply destination of the compressed gas even with the opening degree of the inlet guide vane set to the current set value of the minimum opening degree, the correction value calculating unit calculates correction values with respect to an opening degree command value for the inlet guide vane and an opening degree command value for the recycle valve.

9. The control device according to claim 2, wherein, in a case where an opening degree of the inlet guide vane is greater than the current set value of the minimum opening degree, and an amount of compressed gas flowing out of the compressor is greater than a target amount of supply to a supply destination of the compressed gas even with the opening degree of the inlet guide vane set to the current set value of the minimum opening degree, the correction value calculating unit calculates correction values with respect to an opening degree command value for the inlet guide vane and an opening degree command value for the recycle valve.

10. A gas compressing system comprising:
    the control device according to claim 2;
    the compressor;
    the inlet guide vane;
    the recycle line; and
    the recycle valve.

11. A control method of controlling an inflow adjusting unit that quantitatively adjusts an inflow of a gas into a compressor and controlling a valve provided in a second flow passage branching from a first flow passage from the compressor to a compressed gas supply destination, the method comprising:
    a command calculating step of calculating a command value for at least any one of the inflow adjusting unit and the valve on the basis of a load command value indicating an amount of compressed gas required for the compressed gas supply destination; and
    a correction value calculating step of calculating a correction value with respect to a command value for at least any one of the inflow adjusting unit and the valve on the basis of a difference between a reference value of a state quantity limit value of the inflow adjusting unit and a current set value of the state quantity limit value.

12. A non-transitory computer-readable recording medium storing a program for causing a computer configured to control an inflow adjusting unit that quantitatively adjusts an inflow of a gas into a compressor and to control a valve provided in a second flow passage branching from a first flow passage from the compressor to a compressed gas supply destination to execute:
    a command calculating step of calculating a command value for at least any one of the inflow adjusting unit and the valve on the basis of a load command value indicating an amount of compressed gas required for the compressed gas supply destination; and a correction value calculating step of calculating a correction value with respect to a command value for at least any one of the inflow adjusting unit and the valve on the basis of a difference between a reference value of a state quantity limit value of the inflow adjusting unit and a current set value of the state quantity limit value.

* * * * *